United States Patent [19]

Inagaki

[11] Patent Number: 5,258,193
[45] Date of Patent: Nov. 2, 1993

[54] METHOD FOR FREEZE-STORAGE OF FRESH FRUITS

[76] Inventor: Jitsuo Inagaki, 71, Aza Kamiyashiki, Oaza Itsusiki, Itsusikicho, Hazugun, Aichi, Japan

[21] Appl. No.: 19,426

[22] Filed: Feb. 18, 1993

Related U.S. Application Data

[63] Continuation of Ser. No. 816,272, Jan. 3, 1992, abandoned.

[51] Int. Cl.$^5$ .................................................. A23B 7/00
[52] U.S. Cl. ...................................... 426/524; 426/305; 426/327
[58] Field of Search ............... 426/482, 302, 305, 327, 426/524, 393

[56] References Cited

U.S. PATENT DOCUMENTS 4,751,091  6/1988  Nip et al. .............................. 426/327

FOREIGN PATENT DOCUMENTS 62-278941  12/1987  Japan .................................. 426/327

*Primary Examiner*—George Yeung
*Attorney, Agent, or Firm*—Armstrong, Westerman, Hattori, McLeland & Naughton

[57] ABSTRACT

The object of the present invention is to provide a method for freeze-storage of fresh fruit, by which taste and flavor of ripe natural fruits can be maintained for long time and at relatively low cost.

The method for freeze-storage according to the present invention is characterized in that fresh fruit is peeled and cut into appropriate shape, said fresh fruit is immersed into juice of the same fruit, and, after quickly freezing the fruit by spraying liquid nitrogen, it is frozen and stored.

3 Claims, No Drawings

METHOD FOR FREEZE-STORAGE OF FRESH FRUITS

This application is a continuation of application Ser. No. 816,272 filed Jan. 3, 1992, now abandoned.

BACKGROUND OF THE INVENTION

The present invention relates to a method for freeze-storage of fresh fruits, by which the good taste of ripe natural fruits can be maintained for long time.

Fruits such as banana, mango, papaya, etc. are produced in large quantity in tropical countries such as the Philippines. When the ripe fruits are exported, the quality of the fruits changes during transportation. Thus, the fruits are harvested while they are not still ripened yet. After the fruits are transported to importing country, the fruits are ripened through maturation processing and are then distributed to the consumers.

Under such circumstances, the flavor and the taste of natural fruits are reduced, but there is no other alternative because, if ripe natural fruits exported, they are often become rotten during long time for transportation.

To import natural fresh fruits, it is necessary to perform disinfection and sterilization processing in accordance with the Plant Protection Law, and this leads to cost increase.

On the other hand, it has been the practice to prepare canned fruits and store them for long period, but it is practically impossible to preserve fresh fruits for a long time without losing natural flavor and taste of the fruits, and there is no novel idea for such processing.

SUMMARY OF THE INVENTION

To solve the above problems, it is an object of the present invention to provide a method for freeze-storage of fresh fruits, by which it is possible to preserve the flavor and taste of ripe fruits and to attain such purpose without increasing the cost.

It is another object of the present invention to provide a method for freeze-storage of fresh fruits, by which it is possible to transport and import, the fruits produced in tropical countries in the ripened state.

To attain the above objects, the present inventor has found a method, in which an instantaneously frozen film of fruit juice is formed by liquid nitrogen on surface of peeled fresh fruit using juice of the same fruit. As the result, it has been found that flavor and taste of the fruits are preserved almost perfectly for very long time by freezing the fruits.

Specifically, the method according to the present invention is characterized in that a fresh fruit is peeled and cut into appropriate pieces and shapes, said fresh fruit is immersed in juice of the same fruit, and this is frozen and stored after quickly freezing it by spraying liquid nitrogen.

The cause of the effect of the present invention where fruit is effectively protected by a frozen film of the same fruit juice by forming an instantaneously frozen film by liquid nitrogen is not theoretically elucidated yet. During the freezing process, heat of vaporization is taken away, and the fruit surface is dried. Thus, migration of moisture between cellular membranes is prevented, oxygen is blocked, and oxidation of the fruits can be effectively avoided.

The above and other objects and advantages of the invention will become more apparent from the following description.

DETAILED DESCRIPTION OF THE PREFERRED EMBODIMENTS

In the present invention, fresh fruit is peeled and cut into appropriate shapes, and it is preferable that the fruit should be cut into such shape that original taste and flavor can be maintained. This is because the shape of the fruit gives strong influence on the taste when it is eaten. For example, when water melon is sliced into pieces too thin, the flavor and taste specific to water melon is lost. However, if watermelon is cut into blocks with a certain thickness, fragrant and abundant juice spreads into mouth, and a person eating the fruit finds it very delicious. For the same reason, it is preferable to cut a mango into circular or rectangular shape, and to cut a papaya in rectangular shape. A banana may be eaten by simply peeling it, and there is not much difference in taste due to the difference in shape. Thus, there is no need to cut banana into a specific shape. The fruit should be cut into shapes such that it is cut into minimal units which are suitable to maintain its taste by size and volume. The reasons for this are as follows: The fruits have very weak cellular membranes. If there is a significant difference in time for cooling down the inner and outer surfaces of the fruits, cellular membranes are destroyed. When frozen fruits are thawed, both external appearance and taste undergo drastic change. As the result, the taste is lost and the fruits are no longer suitable for eating. For this reason, it is necessary to cut the fruits into relatively smaller shapes so that the fruits are thawed with no substantial difference in the thawing time between the fruit surface and its core and that the fruits can be easily put into mouth of a person eating it.

The fruit thus peeled and cut must be immersed in juice of the same fruit. In so doing, not only can the discoloration of the fruit effectively prevented, but also the original flavor and taste of each fruit can be maintained.

After immersing, the fruits are quickly frozen by liquid nitrogen in a freezer. It is preferable to freeze the fruits at $-40°$ C. to $-50°$ C. within 1 to 3 minutes so that the fruits can be frozen within a short time to the cores, although the temperature and time may vary according to types and shapes of the fruits. If the fruit is frozen in such a manner that it takes long time to freeze to its core, fruit flesh (sarcocarp) may change, and the object of the present invention may not be attained. After freezing the fruit, it can be preserved for long time in a freezer. The frozen fruit may be eaten as it is or it may be thawed and may be eaten as fruit salad after thawing.

The process for sterilizing fruits, the process for cutting peeled fruits, the process for immersing cut fruits in juice, and the freezing process should be performed in a sterilized chamber.

In the following, description is given on several embodiments of the present invention, while the invention is in no way limited to the embodiments.

Example 1

Ripe banana produced in the Philippines was peeled after sterilization processing, and the peeled banana was immersed in banana juice. Then this was quickly frozen to $-48°$ C. within 2 minutes by spraying liquid nitrogen in a freezer, and the frozen fruit was stored in the freezer. This banana was thawed at room temperature after 6 months. There was no substantial change in external appearance, taste and flavor of the fruit from the fruit before freezing. Example 2

Mango, pineapple and papaya after sterilization processing were peeled. The mango was cut into a rectangular shape, the pineapple into a semicircular shape, and the papaya into a circular shape, and these were immersed in juice of each fruit respectively. These fruits were quickly frozen to −48° C. within 2 minutes by spraying liquid nitrogen in a freezer, and the frozen fruits were stored in the freezer. The frozen fruits were thawed at room temperature after 6 months. There was no substantial difference in external appearance, taste and flavor of the fruits from the fruits before freezing.

As described above, the frozen film of juice of the same fruit is formed by liquid nitrogen on the surface of the peeled fruit according to the present invention. Thus, the external appearance, taste and flavor do not undergo substantial change for long time. This makes it possible to import ripe fruits produced in tropical countries such as the Philippines at very low cost, and this will enrich and improve the life style in eating.

Moreover, because peeled fruits are frozen and imported according to the present invention, there is no need to sterilize the fruits in accordance with the Plant Protection Law, and this will lead to further reduction of the cost.

What is claimed is:

1. A method for freeze-storage of fruit, comprising providing a quantity of fresh fruit all of the same type, peeling the provided fresh fruit into peeled fruit, cutting the peeled fruit into an appropriate shape, immersing said peeled fruit in a juice consisting of juice of the same fruit, quickly freezing said peeled fruit by spraying with liquid nitrogen so as to seal said peeled fresh fruit by a frozen film of the juice, and then storing said frozen fruit.

2. A method for freeze-storage of fresh fruit according to claim 1, wherein said fresh fruit is a ripe fresh fruit.

3. A method for freeze-storage according to claim 1, wherein the freezing by said liquid nitrogen is performed at −40° C. to −50° C. within 1 to 3 minutes.

* * * * *